(12) United States Patent
Su et al.

(10) Patent No.: US 11,076,207 B2
(45) Date of Patent: Jul. 27, 2021

(54) SYSTEM AND METHOD FOR ADAPTIVE VIDEO

(71) Applicant: International Business Machines Corporation, Armonk, NY (US)

(72) Inventors: Chih-Wen Su, Taipei (TW); Jeff Hsueh-Chang Kuo, Taipei (TW); Ying-Chen Yu, Taipei (TW)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/179,263

(22) Filed: Nov. 2, 2018

(65) Prior Publication Data

US 2020/0145737 A1  May 7, 2020

(51) Int. Cl.
| | |
|---|---|
| H04N 7/10 | (2006.01) |
| H04N 7/025 | (2006.01) |
| H04N 21/8541 | (2011.01) |
| H04N 21/45 | (2011.01) |

(52) U.S. Cl.
CPC ..... *H04N 21/8541* (2013.01); *H04N 21/4532* (2013.01)

(58) Field of Classification Search
CPC ............. H04N 21/252; H04N 21/4532; H04N 21/8549
See application file for complete search history.

(56) References Cited

U.S. PATENT DOCUMENTS

| | | | |
|---|---|---|---|
| 7,784,069 B2 | 8/2010 | Boss et al. | |
| 9,082,092 B1 | 7/2015 | Henry | |
| 10,455,297 B1 * | 10/2019 | Mahyar | ............. H04N 21/4532 |
| 10,528,631 B1 * | 1/2020 | Nordhagen | ........... G06F 16/904 |
| 2007/0028266 A1 | 2/2007 | Trajkovic et al. | |
| 2007/0099684 A1 | 5/2007 | Butterworth | |
| 2012/0311625 A1 * | 12/2012 | Nandi | ............... H04N 21/45457 725/28 |
| 2013/0343721 A1 * | 12/2013 | Abecassis | .......... H04N 21/8549 386/241 |
| 2017/0134776 A1 * | 5/2017 | Ranjeet | ................ H04N 21/252 |
| 2018/0014077 A1 * | 1/2018 | Hou | .................. H04N 21/26233 |
| 2018/0288478 A1 * | 10/2018 | Durham | ............. H04N 21/4542 |
| 2019/0373330 A1 * | 12/2019 | Bloch | .............. H04N 21/25891 |
| 2020/0077142 A1 * | 3/2020 | Lavie | ............... H04N 21/25891 |

FOREIGN PATENT DOCUMENTS

WO    2014108195 A1    7/2014

OTHER PUBLICATIONS

Kaliamoorthi, Amudha, "System and Method to extract content based on genre", Jun. 13, 2010 (2 pages).

* cited by examiner

*Primary Examiner* — Gigi L Dubasky
(74) *Attorney, Agent, or Firm* — Richard A. Wilhelm

(57) ABSTRACT

A method, computer program product, and computer system for receiving, by a computing device, one or more user preferences for a video clip. The one or more user preferences may be matched with one or more branches of the video clip, wherein each of the one or more branches may include one or more segments of the video clip. The one or more segments of the video clip may be selected from the one or more branches based upon, at least in part, matching the one or more user preferences with the one or more branches of the video clip. The video clip may be composed based upon, at least in part, the one or more user preferences.

15 Claims, 9 Drawing Sheets

SYSTEM AND METHOD FOR ADAPTIVE VIDEO

BACKGROUND

Users may enjoy watching video clips (e.g., movies) for entertainment or educational purposes. When it comes to movies, for example, users may have different personalities, which may result in their respective interests differing in various parts of the same movie. For instance, a first user may have more of an interest in action, whereas a second user may have more of an interest in comedy. In the example, each respective user may enjoy the movie more if the movie had longer segments associated with their interests.

BRIEF SUMMARY OF DISCLOSURE

In one example implementation, a method, performed by one or more computing devices, may include but is not limited to receiving, by a computing device, one or more user preferences for a video clip. The one or more user preferences may be matched with one or more branches of the video clip, wherein each of the one or more branches may include one or more segments of the video clip. The one or more segments of the video clip may be selected from the one or more branches based upon, at least in part, matching the one or more user preferences with the one or more branches of the video clip. The video clip may be composed based upon, at least in part, the one or more user preferences.

One or more of the following example features may be included. Composing the video clip may include replacing at least one segment of a main branch of the video clip with at least one segment of the one or more segments of the video clip from the one or more branches. At least a portion of the main branch of the video clip may be immutable. The one or more user preferences may include one or more genres. Each of the one or more branches may be associated with a genre of the one or more genres. The one or more user preferences may be updated while the video clip is playing. Each segment may include metadata, wherein the metadata may include a name of the one or more branches associated with a respective segment and a timestamp of the respective segment.

In another example implementation, a computing system may include one or more processors and one or more memories configured to perform operations that may include but are not limited to receiving one or more user preferences for a video clip. The one or more user preferences may be matched with one or more branches of the video clip, wherein each of the one or more branches may include one or more segments of the video clip. The one or more segments of the video clip may be selected from the one or more branches based upon, at least in part, matching the one or more user preferences with the one or more branches of the video clip. The video clip may be composed based upon, at least in part, the one or more user preferences.

One or more of the following example features may be included. Composing the video clip may include replacing at least one segment of a main branch of the video clip with at least one segment of the one or more segments of the video clip from the one or more branches. At least a portion of the main branch of the video clip may be immutable. The one or more user preferences may include one or more genres. Each of the one or more branches may be associated with a genre of the one or more genres. The one or more user preferences may be updated while the video clip is playing. Each segment may include metadata, wherein the metadata may include a name of the one or more branches associated with a respective segment and a timestamp of the respective segment.

In another example implementation, a computer program product may reside on a computer readable storage medium having a plurality of instructions stored thereon which, when executed across one or more processors, may cause at least a portion of the one or more processors to perform operations that may include but are not limited to receiving one or more user preferences for a video clip. The one or more user preferences may be matched with one or more branches of the video clip, wherein each of the one or more branches may include one or more segments of the video clip. The one or more segments of the video clip may be selected from the one or more branches based upon, at least in part, matching the one or more user preferences with the one or more branches of the video clip. The video clip may be composed based upon, at least in part, the one or more user preferences.

One or more of the following example features may be included. Composing the video clip may include replacing at least one segment of a main branch of the video clip with at least one segment of the one or more segments of the video clip from the one or more branches. At least a portion of the main branch of the video clip may be immutable. The one or more user preferences may include one or more genres. Each of the one or more branches may be associated with a genre of the one or more genres. The one or more user preferences may be updated while the video clip is playing. Each segment may include metadata, wherein the metadata may include a name of the one or more branches associated with a respective segment and a timestamp of the respective segment.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview

Figure 1:
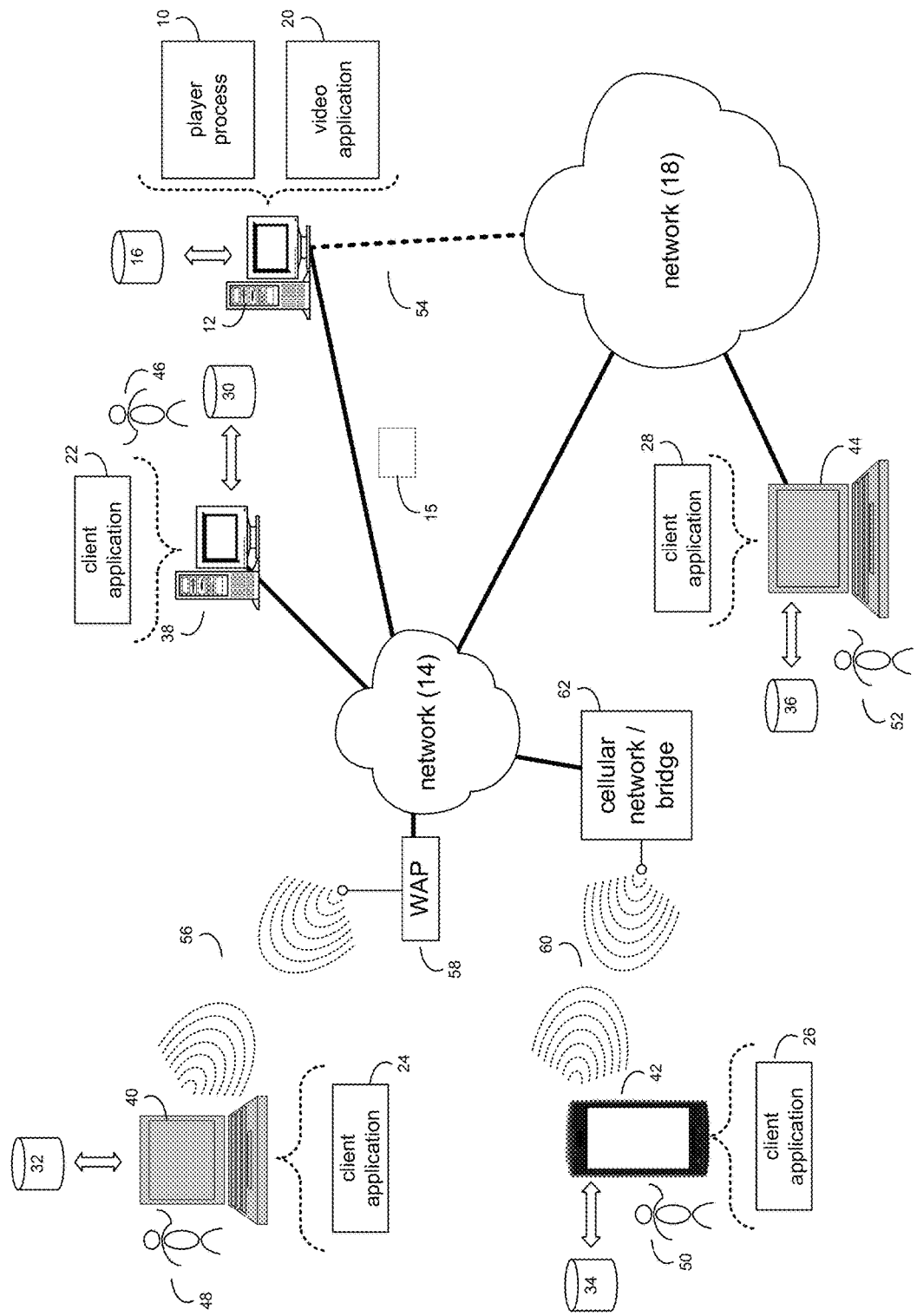
FIG. 1 is an example diagrammatic view of a player process coupled to an example distributed computing network according to one or more example implementations of the disclosure.

As noted above, users may enjoy watching video clips (e.g., movies) for entertainment or educational purposes. When it comes to movies, for example, users may have different personalities, which may result in their respective interests differing in various parts of the same movie. For instance, a first user may have more of an interest in action, whereas a second user may have more of an interest in comedy. In the example, each respective user may enjoy the movie more if the movie had longer segments associated with their interests.

If the movie content could be adapted to emphasize the parts that the user is interested in, the movie may, e.g., get better ratings on its comments, better commercial revenue, etc. From another viewpoint, movies typically are edited (i.e., cut) into a shorter version than what has been filmed originally to fit the limitation of the movie time. Thus, when editing movies, sometimes the director cuts some segments that may have taken a lot of effort and resources to complete, which may be wasteful.

As will be discussed in greater detail, the present disclosure may include a computing device (e.g., a server or mobile computing device) that may combine multiple branches into a movie clip, where each branch may have multiple (video) segments. For instance, in each segment, there may be metadata, which describes the branch name and the timestamp. To be able to play the movie clips according to the preferences of the user, the computing device may include a video player client, which may decompose the combined movie clip and play the selected segments according to a defined portfolio. The portfolio may be defined as a theme (or genre) that a user likes to watch, such as, e.g., action, romance, adventure, comedy, etc. The portfolio may be tuned by adjusting, e.g., a spider chart.

As will be appreciated by one skilled in the art, aspects of the present disclosure may be embodied as a system, a method, and/or a computer program product at any possible technical detail level of integration. The computer program product may include a computer readable storage medium (or media) having computer readable program instructions thereon for causing a processor to carry out aspects of the present invention.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Computer program code for carrying out operations for aspects of the present disclosure may be written in any combination of one or more programming languages, including an object oriented programming language such as Java®, Python, Scala, Ruby, and Node.js, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the example implementation of FIG. 1, there is shown player process 10 that may reside on and may be executed by a computer (e.g., computer 12), which may be connected to a network (e.g., network 14) (e.g., the interne or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer (s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a player process, such as player process 10 of FIG. 1, may receive, by a computing device, one or more user preferences for a video clip. The one or more user preferences may be matched with one or more branches of the video clip, wherein each of the one or more branches may include one or more segments of the video clip. The one or more segments of the video clip may be selected from the one or more branches based upon, at least in part, matching the one or more user preferences with the one or more branches of the video clip. The video clip may be composed based upon, at least in part, the one or more user preferences.

In some implementations, the instruction sets and subroutines of player process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, player process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a video application (e.g., video application 20), examples of which may include, but are not limited to, e.g., a streaming video application, a video server application, a movie on demand (MoD) application, or other application that allows for the composing, streaming, transmitting, and/or playing of media (e.g., video and/or audio). In some implementations, player process 10 and/or video application 20 may be accessed via one or more of client applications 22, 24, 26, 28. In some implementations, player process 10 may be a standalone application, or may be an applet/application/script/extension that may interact with and/or be executed within video application 20, a component of video application 20, and/or one or more of client applications 22, 24, 26, 28. In some implementations, video application 20 may be a standalone application, or may be an applet/application/script/extension that may interact with and/or be executed within player process 10, a component of player process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of player process 10 and/or video application 20. Examples of client applications 22, 24, 26, 28 may include, but are not limited to, e.g., a web conferencing application, a video conferencing application, a voice-over-IP application, a video-over-IP application, an Instant Messaging (IM)/"chat" application, a short messaging service (SMS)/multimedia messaging service (MMS) application, or other application that allows for virtual meeting and/or remote collaboration, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of player process 10 (and vice versa). Accordingly, in some implementations, player process 10 may be a purely server-side application, a purely client-side application, or a hybrid server-side/client-side application that is cooperatively executed by one or more of client applications 22, 24, 26, 28 and/or player process 10.

In some implementations, one or more of client applications 22, 24, 26, 28 may be configured to effectuate some or all of the functionality of video application 20 (and vice versa). Accordingly, in some implementations, video application 20 may be a purely server-side application, a purely client-side application, or a hybrid server-side/client-side application that is cooperatively executed by one or more of client applications 22, 24, 26, 28 and/or video application 20. As one or more of client applications 22, 24, 26, 28, player process 10, and video application 20, taken singly or in any combination, may effectuate some or all of the same functionality, any description of effectuating such functionality via one or more of client applications 22, 24, 26, 28, player process 10, video application 20, or combination thereof, and any described interaction(s) between one or more of client applications 22, 24, 26, 28, player process 10, video application 20, or combination thereof to effectuate such functionality, should be taken as an example only and not to limit the scope of the disclosure.

In some implementations, one or more of users 46, 48, 50, 52 may access computer 12 and player process 10 (e.g., using one or more of client electronic devices 38, 40, 42, 44) directly through network 14 or through secondary network 18. Further, computer 12 may be connected to network 14 through secondary network 18, as illustrated with phantom link line 54. Player process 10 may include one or more user interfaces, such as browsers and textual or graphical user interfaces, through which users 46, 48, 50, 52 may access player process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
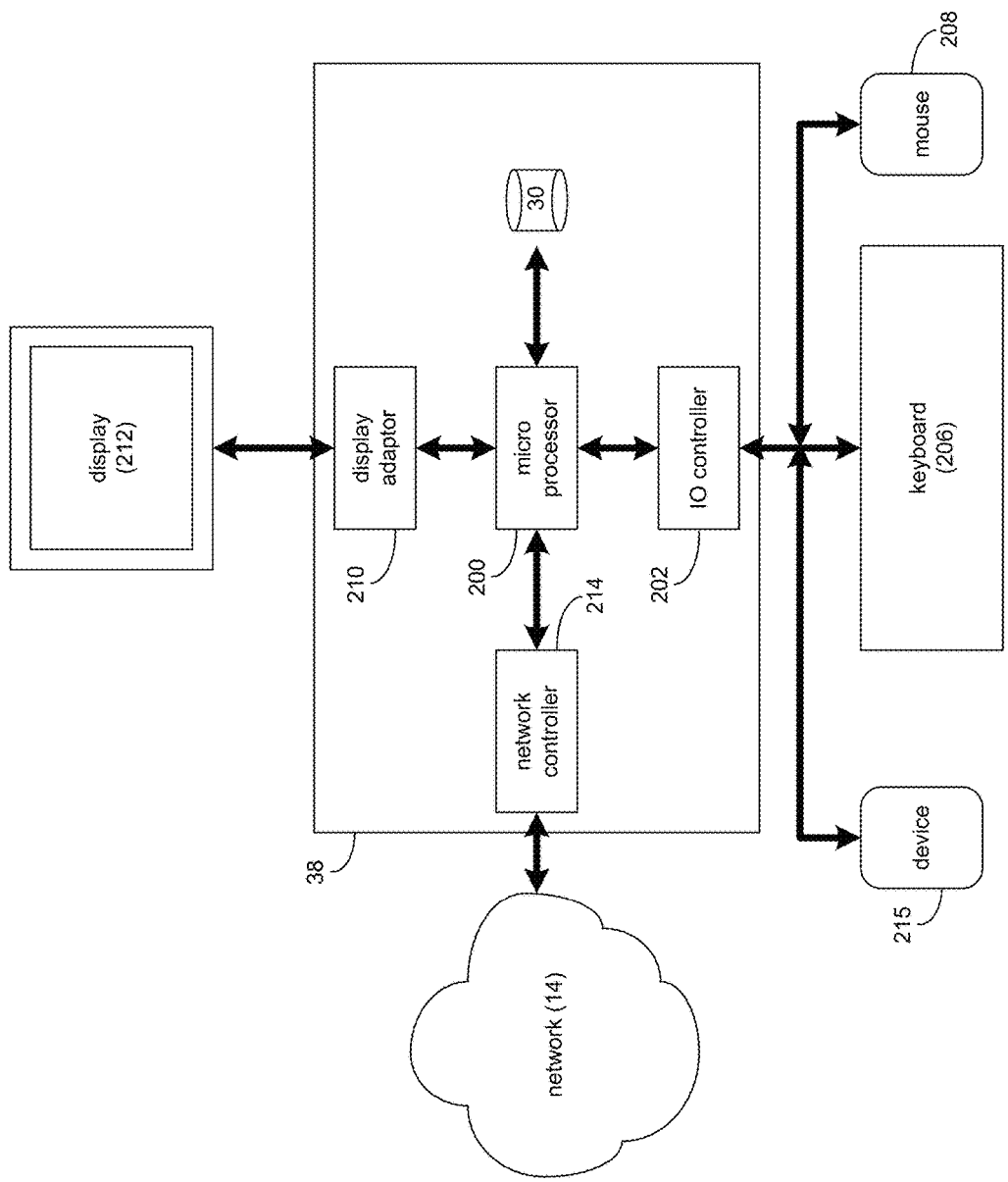
FIG. 2 is an example diagrammatic view of a client electronic device of FIG. 1 according to one or more example implementations of the disclosure.
Figure 3:
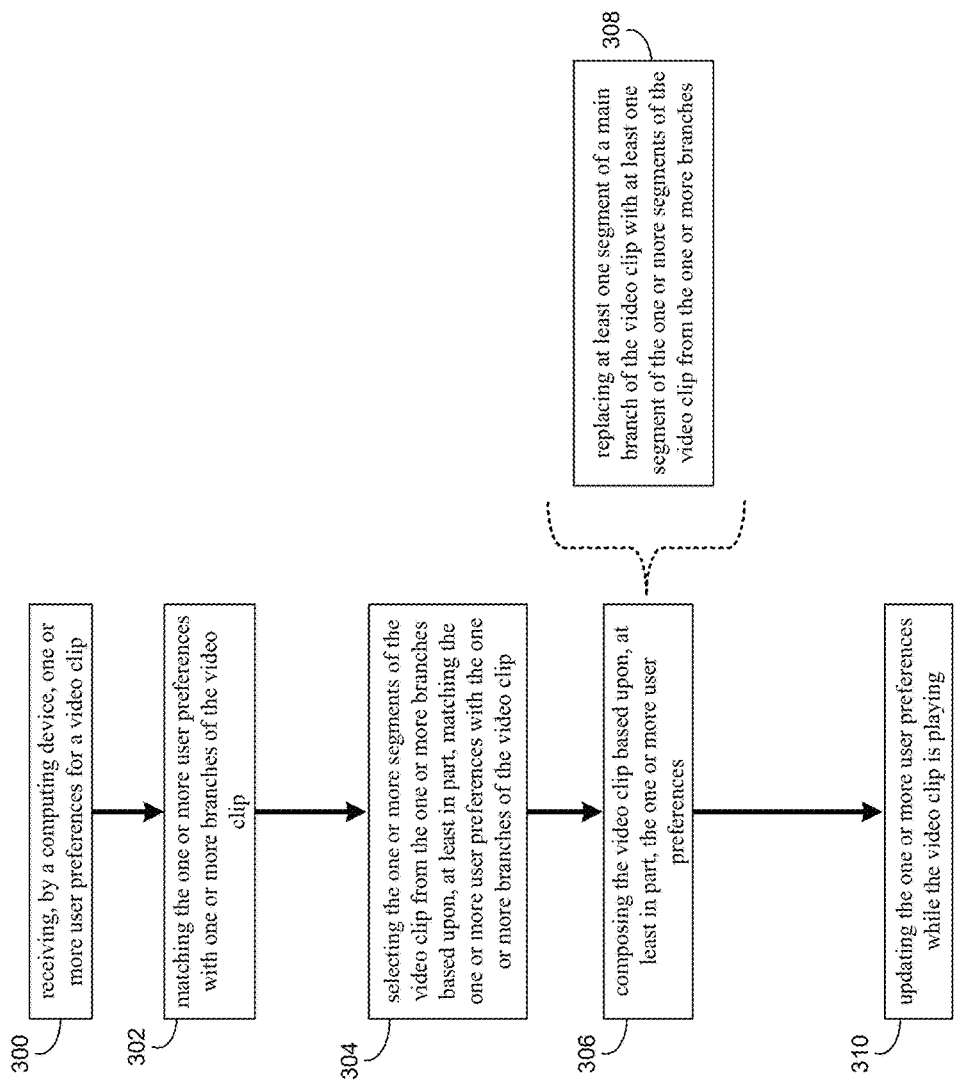
FIG. 3 is an example flowchart of a player process according to one or more example implementations of the disclosure.
Figure 4:
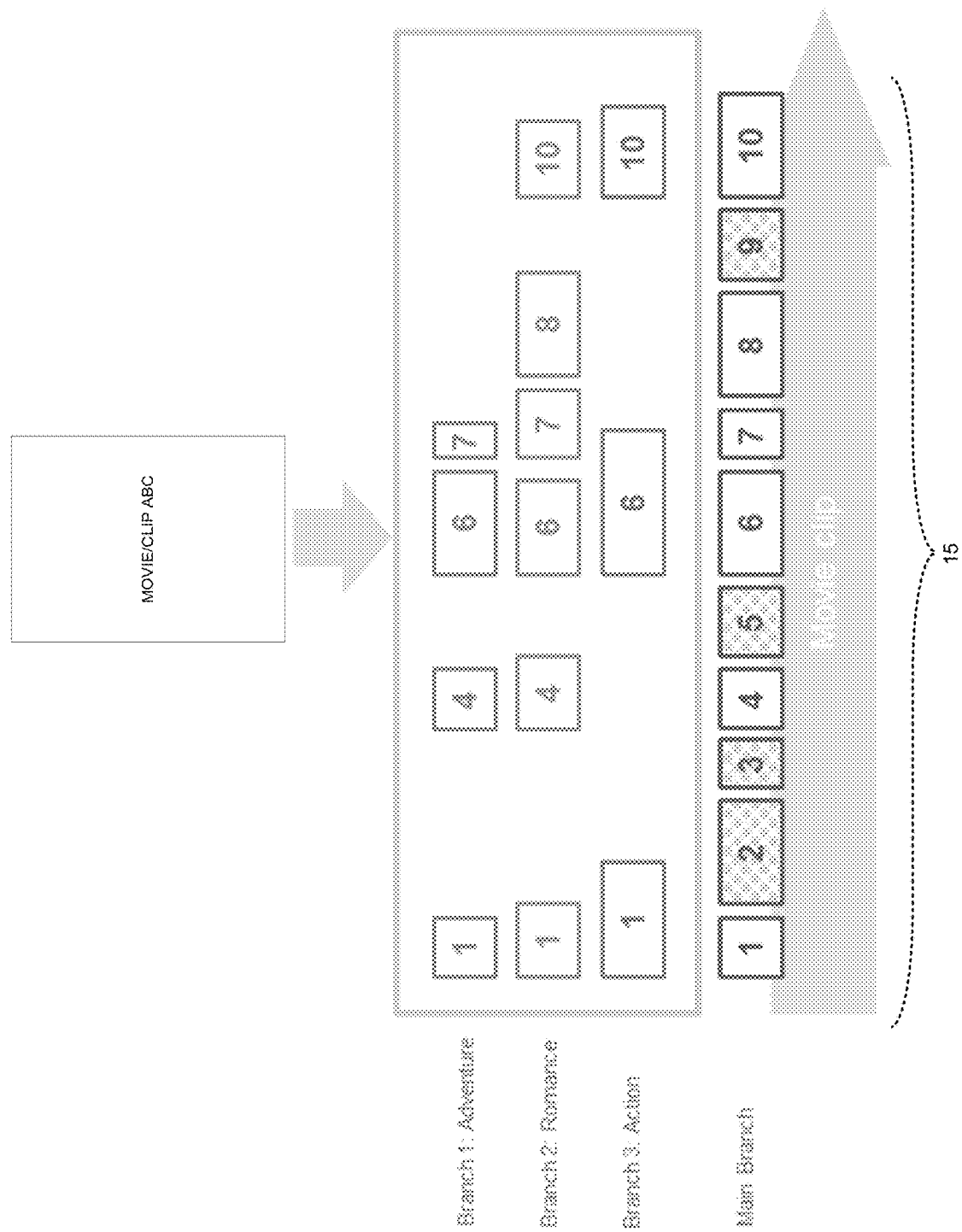
FIG. 4 is an example diagrammatic view of a movie clip with multiple branches and segments according to one or more example implementations of the disclosure.
Figure 5:
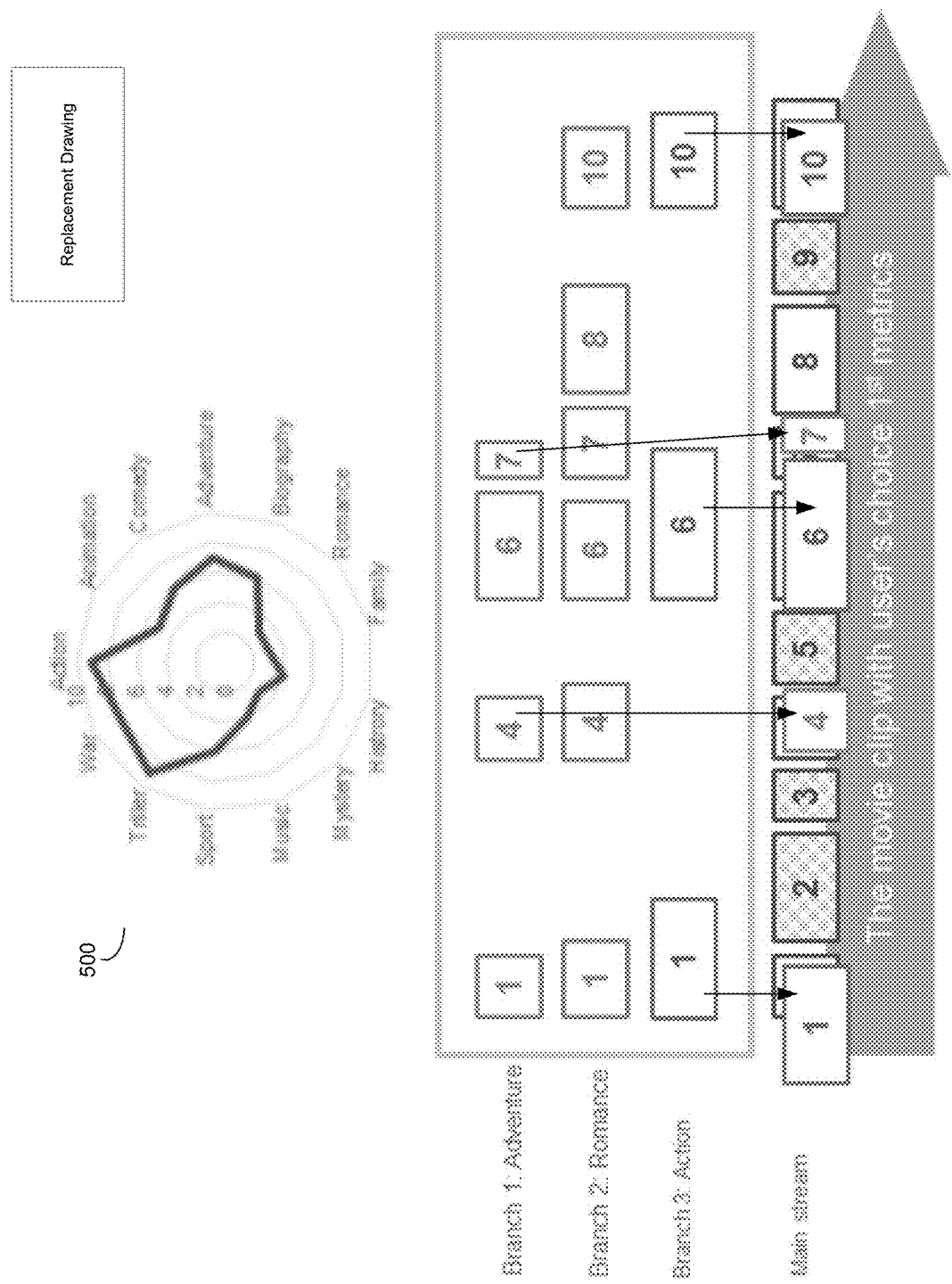
FIG. 5 is an example diagrammatic view of a movie clip with multiple branches and segments according to one or more example implementations of the disclosure.

Referring also to the example implementation of FIG. 2, there is shown a diagrammatic view of client electronic device 38. While client electronic device 38 is shown in this figure, this is for example purposes only and is not intended to be a limitation of this disclosure, as other configurations are possible. Additionally, any computing device capable of executing, in whole or in part, player process 10 may be substituted for client electronic device 38 (in whole or in part) within FIG. 2, examples of which may include but are not limited to computer 12 and/or one or more of client electronic devices 38, 40, 42, 44.

In some implementations, client electronic device 38 may include a processor (e.g., microprocessor 200) configured to, e.g., process data and execute the above-noted code/instruction sets and subroutines. Microprocessor 200 may be coupled via a storage adaptor to the above-noted storage device(s) (e.g., storage device 30). An I/O controller (e.g., I/O controller 202) may be configured to couple microprocessor 200 with various devices (e.g., via wired or wireless connection), such as keyboard 206, pointing/selecting device (e.g., touchpad, touchscreen, mouse 208, etc.), custom device (e.g., device 215), USB ports, and printer ports. A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

As will be discussed below, player process 10 may at least help, e.g., improve a technology, necessarily rooted in computer technology in order to overcome an example and non-limiting problem specifically arising in the realm of computer based video viewing. It will be appreciated that the computer processes described throughout are not considered to be well-understood, routine, and conventional functions.

The Player Process

As discussed above and referring also at least to the example implementations of FIGS. 3-9, player process 10 may receive 300, by a computing device, one or more user preferences for a video clip. Player process 10 may match 302 the one or more user preferences with one or more branches of the video clip, wherein each of the one or more branches may include one or more segments of the video clip. Player process 10 may select 304 the one or more segments of the video clip from the one or more branches based upon, at least in part, matching the one or more user preferences with the one or more branches of the video clip. Player process 10 may compose 306 the video clip based upon, at least in part, the one or more user preferences.

Assume for example purposes only that player process 10 receives a video clip (e.g., movie 15) in its entirety. In some implementations, player process 10 may receive 300 one or more user preferences for a video clip. In some implementations, the one or more user preferences may include one or more genres. For instance, further assume that a first user (e.g., user 46) enjoys certain genres, such as action and adventure, more than other types of genres. Further assume that a second user (e.g., user 48) enjoys certain genres, such as romance, more than other types of genres. In the example, player process 10 may receive 300 these user preferences from user 46 and user 48 through various techniques (e.g., user profile, questionnaire, monitoring user preference changes while the user is watching the movie, etc.). As will be discussed below, while the user preferences may be pre-defined initially, player process 10 may monitor user preference changes while the user is watching the movie.

In some implementations, and referring at least to the example implementation of FIGS. 4-7, the user preferences for movie 15 may be organized into a spider chart (e.g., spider chart 600 and spider chart 700), which may generally be described as a graphical way to display multi-dimension data. Generally, each dimension in spider chart 600 and spider chart 700 may represent one single factor. In the example, it means the movie theme/genre preference (e.g., Action, Thriller, Adventure, Romance, Family, etc.). It will be appreciated that other ways of organizing and illustrating user preferences (e.g., table or bar chart) may be used without departing from the scope of the present disclosure.

In some implementations, player process 10 may match 302 the one or more user preferences with one or more branches of the video clip, wherein each of the one or more branches may include one or more segments of the video clip. In some implementations, each of the one or more branches may be associated with a genre of the one or more genres. For example, and referring still at least to FIGS. 4-7, movie 15 may include multiple branches. One branch may be the "main" branch, which may be how the "original" movie would playout if there were no user preferences. Each of the other branches may be associated with a particular genre (e.g., branch 1 is adventure, branch 2 is romance, branch 3 is action, etc.). Within each branch, there may be individual segments of the video clip (e.g., movie 15), where each segment may generally be described as an alternative version of a segment of the main branch segment according to the genre of the branch. For instance, main branch segment 1 may have originally been a thriller segment. In the example, branch 1 may have an alternative adventure segment 2, branch 1 may have an alternative romance segment 1, and branch 3 may have an alternative action segment 1, each of which may be matched 302 and used to replace the main branch segment 1 based upon, at least in part the user preferences. It will be appreciated that more or less branches/genres and segments may be used without departing from the scope of the disclosure.

In some implementations, player process 10 may select 304 the one or more segments of the video clip from the one or more branches based upon, at least in part, matching the one or more user preferences with the one or more branches of the video clip. For instance, and referring at least to the example implementation of FIG. 5, based on the metrics/preference provided by user 46 and the movie branches/segments (shown in spider chart 500), player process 10 may select 304 the best segment match, then the second best match if available, and then the third best match, etc. and so on. For instance, in the example, since the preferences of user 46 indicated a higher preference for action, and then a next higher preference for adventure, player process 10 may select 304 segments 1, 6, and 10 from branch 3 (action), and may select 304 segments 4 and 7 from branch 1 (adventure). Thus, even though an adventure branch segment 1 is available, if an action branch segment is available, it will be selected over other branch segments as user 46 noted it was the highest preference. Moreover, if an action branch segment is not available (such as with segment 4), the next highest preference segment may be selected, which in the example is from branch 1 (adventure).

Figure 6:
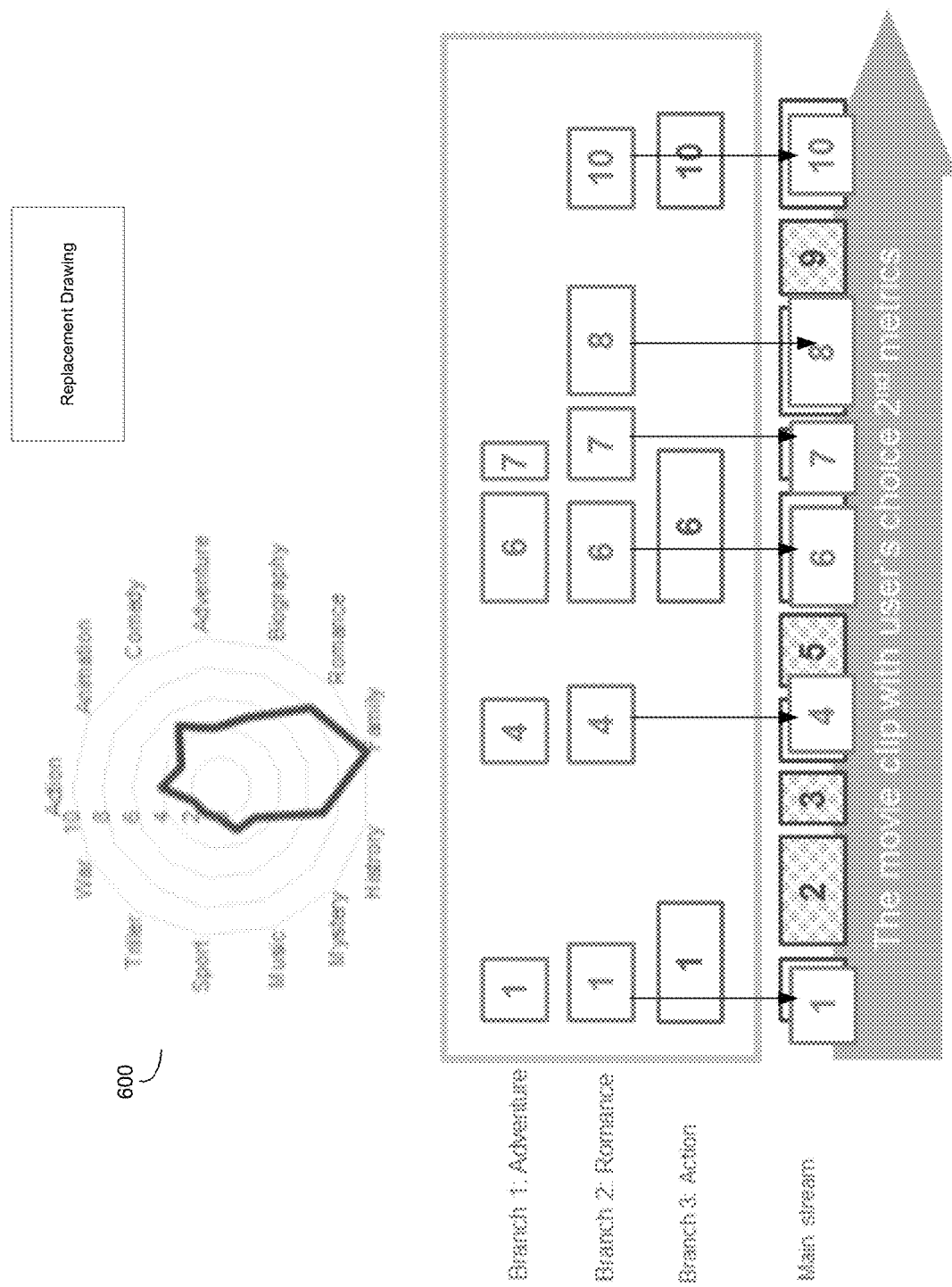
FIG. 6 is an example diagrammatic view of a movie clip with multiple branches and segments according to one or more example implementations of the disclosure.
Figure 7:
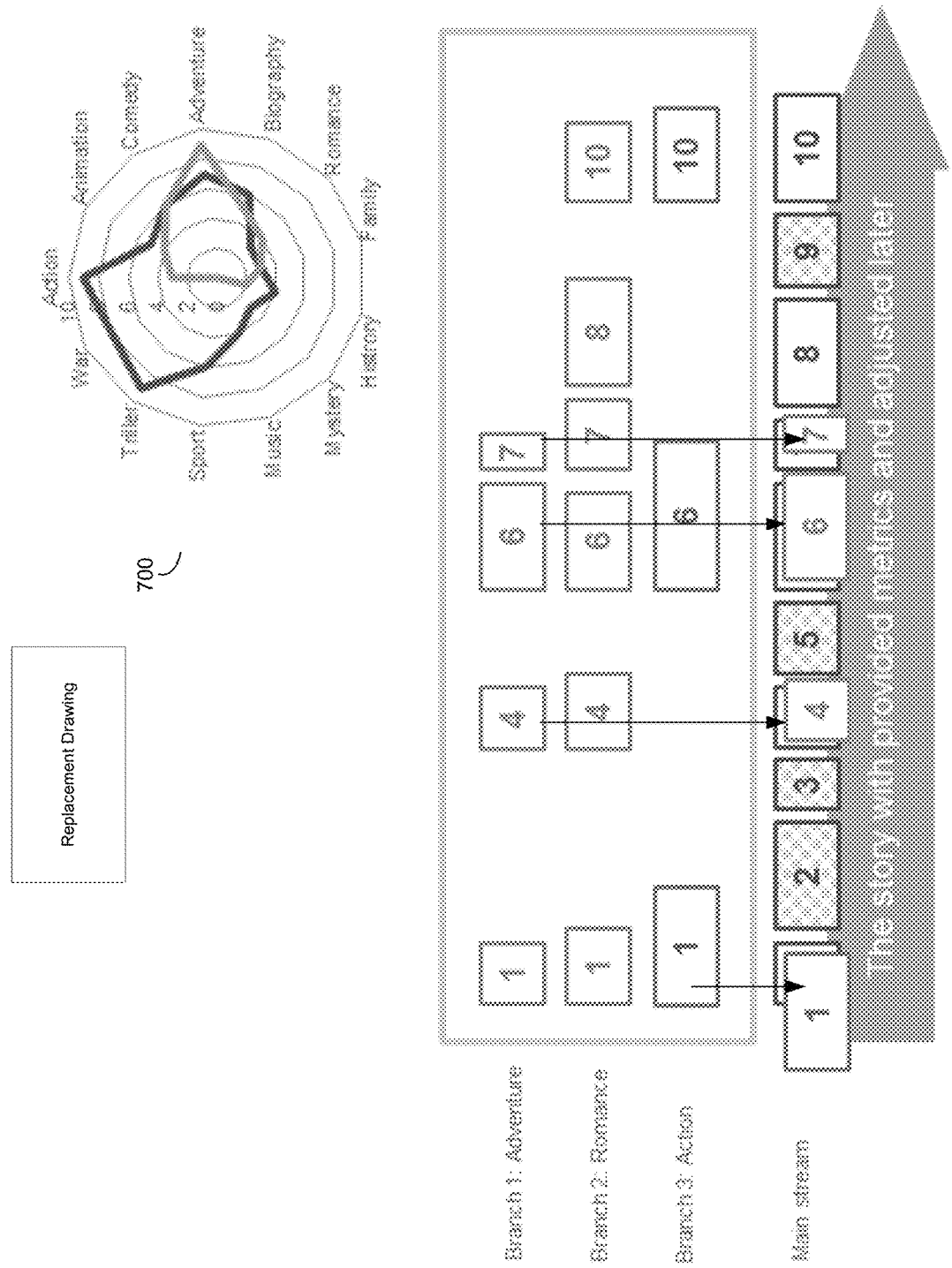
FIG. 7 is an example diagrammatic view of a movie clip with multiple branches and segments according to one or more example implementations of the disclosure.

As another example, and referring at least to the example implementation of FIG. 6, based on the metrics/preference provided by user 48 and the movie branches/segments (shown in spider chart 600), player process 10 may select 304 the best segment match, then the second best match if available, and then the third best match, etc. and so on. For instance, in the example, since the preferences of user 48 indicated a highest preference for romance, player process 10 may select 304 segments 1, 4, 6, 7, 8, and 10 from branch 2 (romance). Thus, even though other branch segments are available, if a romance branch segment is available, it will be selected over other branch segments as user 48 noted it was the highest preference. In some implementations, where user 48 has no strong preference one way or another (e.g., with adventure and action), the segment may be used from main branch.

In some implementations, player process 10 may compose 306 the video clip based upon, at least in part, the one or more user preferences. In some implementations, composing 306 the video clip may include replacing 308 at least one segment of a main branch of the video clip with at least one segment of the one or more segments of the video clip from the one or more branches. For instance, player process 10 may choose the branch based on the user preference, and then check if there is a segment at the time that user is going to watch. That is, player process 10 may play the video and dynamically select the segment from the user preferred branch to play rather than creating a whole new video clip initially with main branch and replacing the segments that the user wants. Thus, in some implementations, there is no new video clip created, but instead, player process 10 plays what is received from the server and at the timestamp that has multiple branch segment options, matched by the segment according to user's preference. For example, and continuing with the above examples, the main branch segments may be replaced 308 with the selected 304 segments. For instance, regarding FIG. 5, player process 10 may select 304 segments 1, 6, and 10 from branch 3 (action) to replace segments 1, 6, and 10 from the main branch segments, and may select 304 segments 4 and 7 from branch 1 (adventure) to replace segments 4 and 7 from the main branch segments, and may maintain the original main branch segments 2, 3, 5, 8, and 9. Regarding FIG. 6, player process 10 may select 304 segments 1, 4, 6, 7, 8, and 10 from branch 2 (romance) to replace segments 1, 4, 6, 7, 8, and 10 from the main branch segments, and may maintain the original main branch segments 2, 3, 5, and 9. Thus, based upon either users individual preferences, they may view the "same" movie, but with swappable segments based upon those preferences.

In some implementations, at least a portion of the main branch of the video clip may be immutable. For instance, a segment may be immutable for at least two reason, e.g., (1) there is no alternative from different branches, or (2) the segment is the main story line and cannot be missed (i.e., meaning, every single audience member must see that important segment). For instance, it may be preferable that there is some effort by the movie writer/director such that the content of the connected segments are reasonably pertinent to the flow of the full storyline. For example, assume user 48 watches segment 2 from the romance branch, any user that watches segment 1 from the adventure branch should similarly flow into any segment 2. For instance, it may not be preferable if there is a situation where a character dies in one branch segment but is suddenly alive in another branch segment later on. Thus, the main story may remain the same all over the branches, only with different genre based elements (e.g., more car racing scenes, more fighting scenes, etc.). As such, some of the main branch segments (e.g., main branch segments 2, 3, 5, and 9) that may be critical to the storyline and/or the flow of the storyline, may be immutable (unreplaceable by other branch segments).

In some implementations, each segment may include metadata, wherein the metadata may include a name of the one or more branches associated with a respective segment and a timestamp of the respective segment. For example, the metadata may be used to provide the information of each individual segment (e.g., branch, segment name/number, segment duration, segment beginning and end timestamps, etc.). This may help player process 10 to determine when to select segments for replacing, and when to pick up the next segments. In the example implementation, each segment may have its own metadata.

Figure 8:
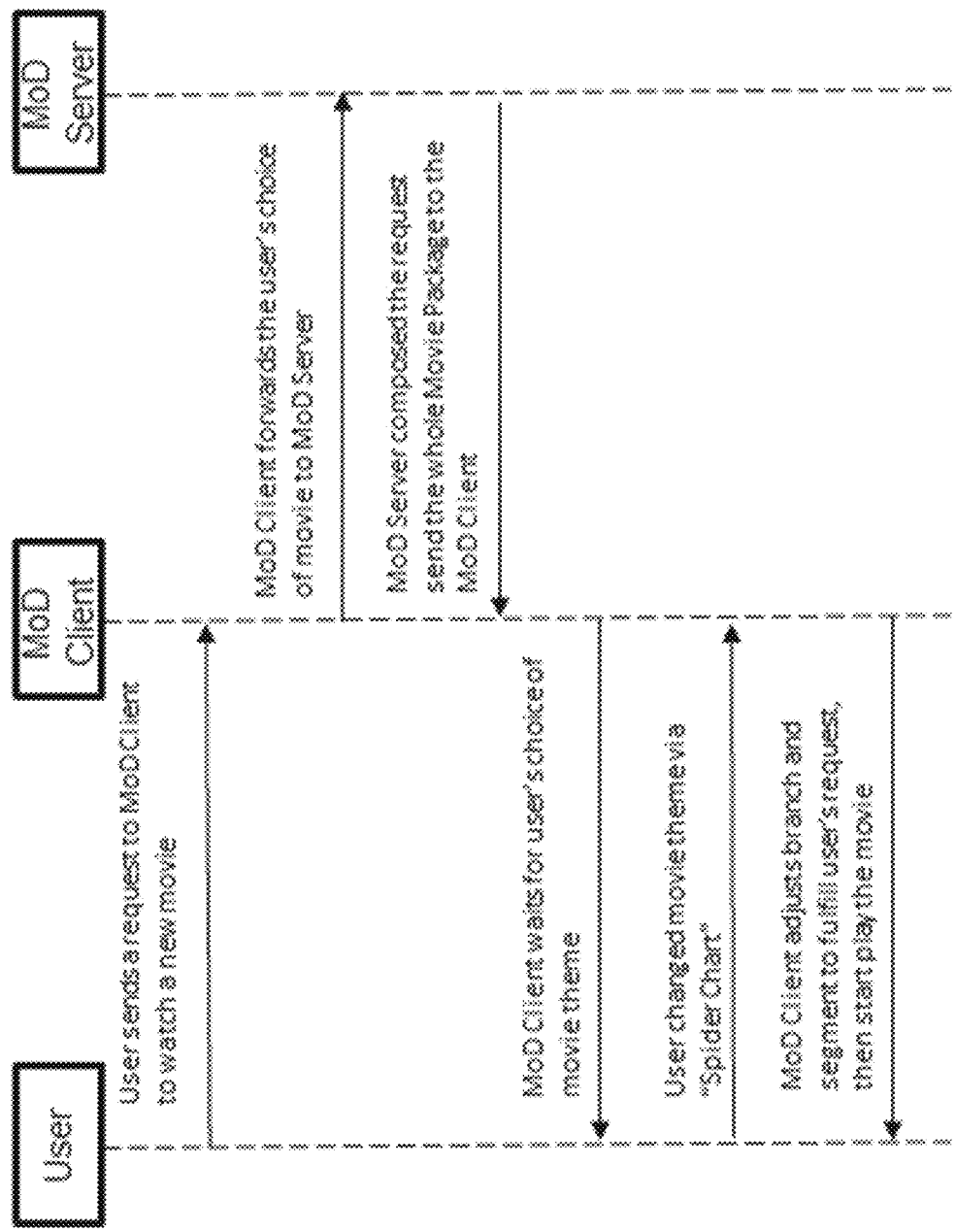
FIG. 8 is an example flowchart of a player process according to one or more example implementations of the disclosure.
Figure 9:
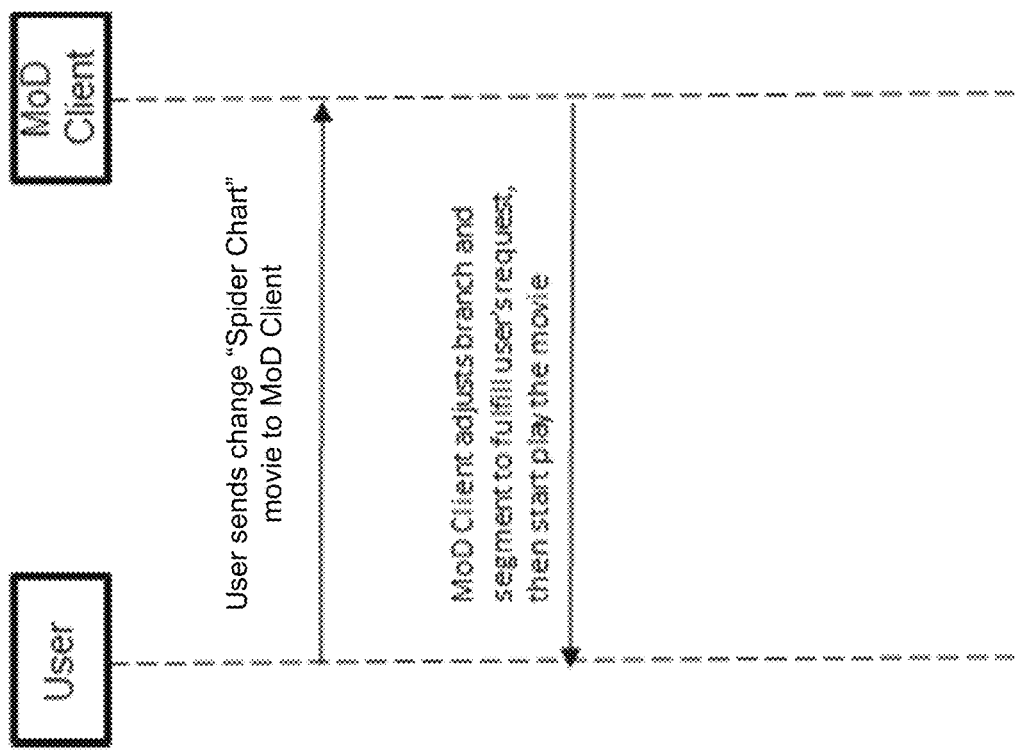
FIG. 9 is an example flowchart of a player process according to one or more example implementations of the disclosure.

Referring at least to the example flowchart of FIG. 8, an alternative way to look at the present disclosure is shown. In the example, the user may send a request to watch a movie to a movie on demand (MoD) client portion of player process 10 (e.g., client electronic device 38). Player process 10 may forward the movie choice to a MoD server (e.g., computer 12), which may send the whole movie package (including the various branch segments) back to player process 10 at the MoD client. The MoD client may then wait for the user's preferences to be received, update the spider chart, and adjust the branches and segments to be used when playing the movie. It will be appreciated that the MoD player may receive the user preferences, and only send the appropriate segments to be played (instead of sending the whole movie package including the various branch segments that may not be used). It will also be appreciated that the movie may be composed at the MoD server and sent to the MoD client, and/or may be composed at the MoD client. Thus, any particular description of the MoD client or the MoD server performing any of the actions described throughout may be interchangeable and should be taken as example only.

In some implementations, player process 10 may update 310 the one or more user preferences while the video clip is playing. For instance, and referring at least to the example flowchart of FIG. 9, in some implementations, while a user may can pre-define their preference initially, player process 10 may monitor or determine a user's preference changes during movie play, and may update 310 the preferences (and accordingly which branch segments to replace) while the video clip is playing (e.g., on-the-fly, in real-time). For instance, and referring at least to the example implementation of FIG. 7, assume user 46 started a movie with their default preference, but adjusts those preference(s) (e.g., from action to more adventure as can be seen from spider chart 700) later after the movie started and/or while it is currently playing. Such changes may be received by a movie on demand (MoD) client portion of player process 10 (e.g., client electronic device 38), and player process 10 may adjust the segments to be replaced accordingly. With that, it can be seen that at the start, the segment from the action branch stream is selected (segment 1), but starting from segment 4 (after the adjustment is detected), the segments from the adventure branch are selected instead.

It will be appreciated that while the present disclosure is described using terms like video clips and movies, other types of media may also be used without departing from the scope of the disclosure. For example, the present disclosure may be applied to different segments of an audio book, streaming media, or any other types of audio/visual media as appropriate. Thus, the use of video clips and movies should be taken as example only and not to otherwise limit the scope of the disclosure.

As will be discussed in greater detail, the present disclosure may include a computing device (e.g., a server or mobile computing device) that may combine multiple branches into a movie clip, where each branch may have multiple (video) segments. For instance, in each segment, there may be metadata, which describes the branch name and the timestamp. To be able to play the movie clips according to the preferences of the user, the computing device may include a video player client, which may decompose the combined movie clip and play the selected segments according to a defined portfolio. The portfolio may be defined as a theme (or genre) that a user likes to watch, such as, e.g., action, romance, adventure, comedy, etc. The portfolio may be tuned by adjusting, e.g., a spider chart.

Thus, a movie clip with one main branch and many branches on some segments of the movie content is disclosed. With multiple genre branches, it may allow the audience to be more attached to the movie. Audiences may define their preference via a portfolio, which in some implementations may remain unchanged until a next update. When playing the clip, player process 10 may select the segment according to the defined portfolio, where some segments are the main story line, which may only exist in one branch (e.g., the main branch). Although other segments may exist in more than one branch (e.g., branch 1 and branch 3), the whole story line may remain the same, only enhancing the content (theme/genre) of the movie.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
receiving, by a computing device, from a user while a video clip is playing, one or more preferences of the user for the video clip, wherein the video clip includes one main branch and one or more genre branches, each genre branch having one or more segments, each segment of a genre branch corresponding with a segment of the main branch, wherein each segment of a genre branch is an alternative version of the corresponding segment of the main branch segment;
matching a highest user preference with the one or more branches of the video clip, wherein each of the one or more branches is associated with a particular genre and includes one or more segments of the video clip;
selecting the one or more segments of the video clip from the one or more branches based upon, at least in part, matching the highest user preference with the one or more branches of the video clip, wherein the one or more segments of the video clip are selected while the video clip is playing and at a time the user is going to watch; and
composing the video clip based upon, at least in part, the one or more user preferences, wherein the composing of the video clip includes replacing at least one segment of the main branch of the video clip with at least one segment of the one or more segments of the video clip from the one or more genre branches associated with a particular genre.

2. The computer-implemented method of claim 1 wherein at least a portion of the main branch of the video clip is immutable.

3. The computer-implemented method of claim 1 wherein the one or more user preferences include one or more genres.

4. The computer-implemented method of claim 1 further comprising updating the one or more user preferences while the video clip is playing.

5. The computer-implemented method of claim 1 wherein each segment includes metadata, wherein the metadata includes a name of the one or more branches associated with a respective segment and a timestamp of the respective segment.

6. A computer program product residing on a computer readable storage medium having a plurality of instructions stored thereon which, when executed across one or more processors, causes at least a portion of the one or more processors to perform operations comprising:
receiving, from a user while a video clip is playing, one or more preferences of the user for the video clip, wherein the video clip includes one main branch and one or more genre branches, each genre branch having one or more segments, each segment of a genre branch corresponding with a segment of the main branch, wherein each segment of a genre branch is an alternative version of the corresponding segment of the main branch segment;

matching a highest user preference with the one or more branches of the video clip, wherein each of the one or more branches is associated with a particular genre and includes one or more segments of the video clip;

selecting the one or more segments of the video clip from the one or more branches based upon, at least in part, matching the highest user preference with the one or more branches of the video clip, wherein the one or more segments of the video clip are selected while the video clip is playing and at a time the user is going to watch; and composing the video clip based upon, at least in part, the one or more user preferences, wherein the composing of the video clip includes replacing at least one segment of the main branch of the video clip with at least one segment of the one or more segments of the video clip from the one or more genre branches associated with a particular genre.

7. The computer program product of claim 6 wherein at least a portion of the main branch of the video clip is immutable.

8. The computer program product of claim 6 wherein the one or more user preferences include one or more genres.

9. The computer program product of claim 6 further comprising updating the one or more user preferences while the video clip is playing.

10. The computer program product of claim 6 wherein each segment includes metadata, wherein the metadata includes a name of the one or more branches associated with a respective segment and a timestamp of the respective segment.

11. A computing system including one or more processors and one or more memories configured to perform operations comprising:

receiving, from a user while a video clip is playing, one or more preferences of the user for the video clip, wherein the video clip includes one main branch and one or more genre branches, each genre branch having one or more segments, each segment of a genre branch corresponding with a segment of the main branch, wherein each segment of a genre branch is an alternative version of the corresponding segment of the main branch segment;

matching a highest user preference with the one or more branches of the video clip, wherein each of the one or more branches is associated with a particular genre and includes one or more segments of the video clip;

selecting the one or more segments of the video clip from the one or more branches based upon, at least in part, matching the highest user preference with the one or more branches of the video clip, wherein the one or more segments of the video clip are selected while the video clip is playing and at a time the user is going to watch; and composing the video clip based upon, at least in part, the one or more user preferences, wherein the composing of the video clip includes replacing at least one segment of the main branch of the video clip with at least one segment of the one or more segments of the video clip from the one or more genre branches associated with a particular genre.

12. The computing system of claim 11 wherein at least a portion of the main branch of the video clip is immutable.

13. The computing system of claim 11 wherein the one or more user preferences include one or more genres.

14. The computing system of claim 11 further comprising updating the one or more user preferences while the video clip is playing.

15. The computing system of claim 11 wherein each segment includes metadata, wherein the metadata includes a name of the one or more branches associated with a respective segment and a timestamp of the respective segment.

* * * * *